US012087200B2

(12) United States Patent
Cho et al.

(10) Patent No.: US 12,087,200 B2
(45) Date of Patent: Sep. 10, 2024

(54) GATE DRIVING CIRCUIT AND DISPLAY DEVICE USING SAME

(71) Applicant: LG DISPLAY CO., LTD., Seoul (KR)

(72) Inventors: Min Ho Cho, Paju-si (KR); Moo Kyoung Hong, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/379,883

(22) Filed: Oct. 13, 2023

(65) Prior Publication Data

US 2024/0221568 A1 Jul. 4, 2024

(30) Foreign Application Priority Data

Dec. 29, 2022 (KR) ........................ 10-2022-0188986

(51) Int. Cl.
*G09G 3/20* (2006.01)

(52) U.S. Cl.
CPC ....... *G09G 3/20* (2013.01); *G09G 2310/0264* (2013.01); *G09G 2330/021* (2013.01); *G09G 2340/0407* (2013.01)

(58) Field of Classification Search
CPC ........... G01R 19/10; G09G 2300/0819; G09G 2300/0842; G09G 2310/08; G09G 2320/0285; G09G 2330/021; G09G 2330/10; G09G 2330/12; G09G 2360/10; G09G 3/006; G09G 3/32; G09G 3/3233; G09G 3/3291
See application file for complete search history.

(56) References Cited

U.S. PATENT DOCUMENTS

2021/0150971 A1* 5/2021 Pyun .................... G09G 3/3233
2022/0319409 A1* 10/2022 Park ..................... G09G 3/3266

* cited by examiner

*Primary Examiner* — Insa Sadio
(74) *Attorney, Agent, or Firm* — Birch, Stewart, Kolasch & Birch, LLP

(57) ABSTRACT

A display device can include a display panel including at least one gate line; and a gate driving circuit to supply a scan signal to the at least one gate line, in which the gate driving circuit includes a plurality of scan signal output circuits configured to be sequentially turned on by a first carry signal input from previous stages to output the scan signal to a corresponding gate line and turned off by a second carry signal input from following stages. Also, the display device includes an output control circuit to transfer the first carry signal input to a scan signal output circuit to be turned off to a scan signal output circuit to be turned on, and transfer the second carry signal input from a stage following the scan signal output circuit to be turned off to a scan signal output circuit that outputs the first carry signal.

20 Claims, 8 Drawing Sheets

GATE DRIVING CIRCUIT AND DISPLAY DEVICE USING SAME

CROSS REFERENCE TO RELATED APPLICATION

This application claims priority to Korean Patent Application No. 10-2022-0188986, filed in the Republic of Korea on Dec. 29, 2022, the entirety of which is hereby expressly incorporated by reference as if fully set forth herein.

BACKGROUND

Field of the Invention

The present disclosure relates to a gate driving circuit and a display device using the same.

Discussion of the Related Art

With the development of information technology, the market for display devices, which are communication media between users and information, is growing. Accordingly, display devices such as organic light emitting displays (OLEDs), quantum dot displays (QDDs), liquid crystal displays (LCDs), and plasma display panels (PDPs) are increasingly used.

Display devices can display images by supplying driving signals, such as scan signals and data signals, to sub-pixels formed in display panels such that the sub-pixels transmit light or directly emit light. Since the resolutions and frequencies of such display devices depend on a scan signal supply circuit designed during manufacture, there are limitations in displaying image data with various resolutions. For example, display devices may not be able to change their resolution or may have difficulty in being able to provide a wide range of different resolutions that match different type of content.

However, since some content sources provide image data set to different resolutions, a technique for effectively providing images with different resolutions or providing a changeable resolution in a single display device is desired.

SUMMARY OF THE DISCLOSURE

Accordingly, the present disclosure is directed to a gate driving circuit and a display device using the same that substantially obviate one or more problems due to limitations and disadvantages of the related art.

Embodiments disclosed in the present disclosure provide a gate driving circuit and a display device using the same which can change a resolution in response to an input image.

Additional advantages, objects, and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these objects and other advantages and in accordance with the purpose of the disclosure, as embodied and broadly described herein, a display device includes a display panel including at least one gate line corresponding to pixel areas arranged in a horizontal direction, and a gate driving circuit configured to supply a scan signal to the gate line, in which the gate driving circuit includes a plurality of scan signal output circuits configured to be sequentially turned on by a first carry signal input from previous stages to output the scan signal to the gate line and to be turned off by a second carry signal input from following stages, and an output control circuit configured to transfer the first carry signal input to a scan signal output circuit to be turned off to a scan signal output circuit to be turned on and to transfer the second carry signal input from a stage following the scan signal output circuit to be turned off to a scan signal output circuit that outputs the first carry signal.

The gate driving circuit can include a top dummy circuit configured to be turned on by a start pulse signal input from the outside to apply the first carry signal to a first scan signal output circuit among the scan signal output circuits, and a bottom dummy circuit configured to be turned on by the first carry signal input from a last scan signal output circuit among the plurality of scan signal output circuits to apply the second carry signal to the last scan signal output circuit.

The output control circuit can include a top output control circuit configured to transfer the first carry signal input from the top dummy circuit to the first scan signal output circuit to an N-th scan signal output circuit and to transfer the second carry signal output from the N-th scan signal output circuit to the top dummy circuit according to a selection signal for turning off top scan signal output circuits including the first scan signal output circuit to an (N−1)-th scan signal output circuit.

The top output control circuit can include a first switch configured to be turned on when the selection signal for turning off the top scan signal output circuits including the first scan signal output circuit to the (N−1)-th scan signal output circuit is input to set a path of the first carry signal, and a second switch configured to be turned on when the selection signal for turning off the top scan signal output circuits including the first scan signal output circuit to the (N−1)-th scan signal output circuit is input to set a path of the second carry signal.

The output control circuit can include a bottom output control circuit configured to transfer the first carry signal input to an m-th scan signal output circuit to the bottom dummy circuit and to transfer the second carry signal output from the bottom dummy circuit to a scan signal output circuit that outputs the first carry signal according to a selection signal for turning off bottom scan signal output circuits including the m-th scan signal output circuit to the last scan signal output circuit.

The bottom output control circuit can include a first switch configured to be turned on when the selection signal for turning off the bottom scan signal output circuits including the m-th scan signal output circuit to the last scan signal output circuit is input to set a path of the first carry signal, and a second switch configured to be turned on when the selection signal for turning off the bottom scan signal output circuits including the m-th scan signal output circuit to the last scan signal output circuit is input to set a path of the second carry signal.

The output control circuit can transfer the first carry signal applied from a k-th scan signal output circuits among the scan signal output circuits to a (k+2)-th scan signal output circuit, and transfer the second carry signal to a (k−2)-th scan signal output circuit.

The output control circuit can include a first switch configured to transfer the first carry signal applied from a first top dummy circuit to the N-th scan signal output circuit and to transfer the first carry signal applied from a second top dummy circuit to an (N+1)-th scan signal output circuit according to the selection signal for turning off the top scan signal output circuits including the first scan signal output circuit to the (N−1)-th scan signal output circuit, and a second switch configured to transfer the second carry signal applied from the N-th scan signal output circuit to the first top dummy circuit and to transfer the second carry signal applied from the (N+1)-th scan signal output circuit to the second top dummy circuit according to the selection signal for turning off the top scan signal output circuits including the first scan signal output circuit to the (N−1)-th scan signal output circuit.

The output control circuit can include a first switch configured to transfer the first carry signal applied from an (m−2)-th scan signal output circuit to the first bottom dummy circuit and to transfer the first carry signal applied from an (m−1)-th scan signal output circuit to the second bottom dummy signal according to the selection signal for turning off the bottom scan signal output circuits including the m-th scan signal output circuit to the last scan signal output circuit, and a second switch configured to transfer the second carry signal applied from the first bottom dummy circuit to the (m−1)-th scan signal output circuit and to transfer the second carry signal applied from the second bottom dummy circuit to the (m−1)-th scan signal output circuit according to the selection signal for turning off the bottom scan signal output circuits including the m-th scan signal output circuit to the last scan signal output circuit.

Each of the scan signal output circuits can sequentially output scan signals for four lines when turned on by receiving the first carry signal.

In another aspect of the present disclosure, a gate driving circuit includes a plurality of scan signal output circuits configured to be sequentially turned on by a first carry signal input from previous stages to output at least one scan signal and to be turned off by a second carry signal input from following stages, and an output control circuit configured to transfer the first carry signal input to a scan signal output circuit to be turned off to a scan signal output circuit to be turned on and to transfer the second carry signal input from a stage following the scan signal output circuit to be turned off to a scan signal output circuit that outputs the first carry signal.

The gate driving circuit can further include at least one top dummy circuit configured to be turned on by a start pulse signal input from the outside to apply the first carry signal to a first scan signal output circuit among the scan signal output circuits, and at least one bottom dummy circuit configured to be turned on by the first carry signal input from a last scan signal output circuit among the scan signal output circuits to apply the second carry signal to the last scan signal output circuit.

The output control circuit can include a top output control circuit configured to transfer the first carry signal input from the top dummy circuit to the first scan signal output circuit to an N-th scan signal output circuit and to transfer the second carry signal output from the N-th scan signal output circuit to the top dummy circuit according to a selection signal for turning off top scan signal output circuits including the first scan signal output circuit to an (N−1)-th scan signal output circuit.

The output control circuit can include a bottom output control circuit configured to transfer the first carry signal input to an m-th scan signal output circuit to the bottom dummy circuit and to transfer the second carry signal output from the bottom dummy circuit to a scan signal output circuit that outputs the first carry signal according to a selection signal for turning off bottom scan signal output circuits including the m-th scan signal output circuit to the last scan signal output circuit.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

Figure 1:
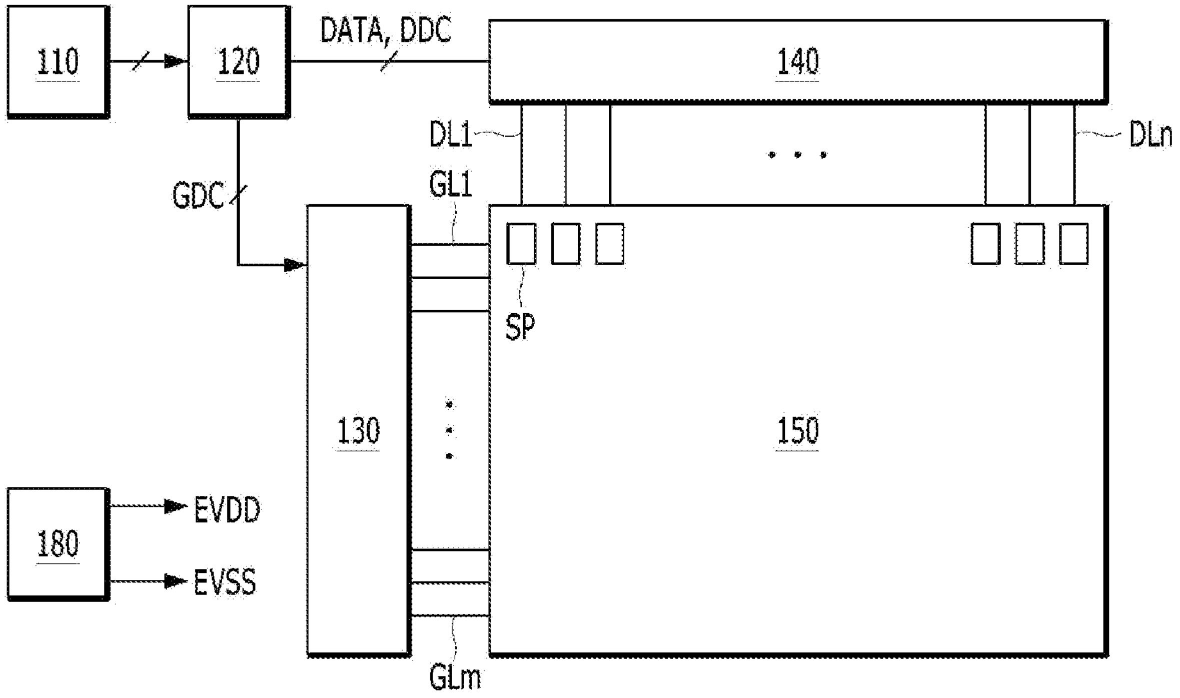
FIG. 1 is a block diagram schematically showing a configuration of a display device according to an embodiment of the present disclosure.

The advantages, features and methods for accomplishing the same of the present disclosure will become more apparent through the following detailed description with respect to the accompanying drawings. However, the present disclosure is not limited by embodiments described below and is implemented in various different forms, and the embodiments are provided so that this disclosure will be thorough and complete, and will fully convey the scope of the invention to those skilled in the art. The present invention is defined by the scope of the claims.

Shapes, sizes, ratios, angles, numbers, etc. shown in the figures to describe embodiments of the present disclosure are exemplary and thus are not limited to particulars shown in the figures. Like numbers refer to like elements throughout the specification. It will be further understood that, when the terms "include," "have" and "comprise" are used in the present disclosure, other parts can be added unless "only" is used. An element described in the singular form is intended to include a plurality of elements unless context clearly indicates otherwise.

In interpretation of a component, the component is interpreted as including an error range unless otherwise explicitly described.

It will be understood that, when an element is referred to as being "on," "above," "under" or "by" another element, it can be "directly" on or under another element or can be "indirectly" formed such that an intervening element is also present.

In the following description of the embodiments, "first" and "second" are used to describe various components, but such components are not limited by these terms. The terms are used to discriminate one component from another component. Accordingly, a first component mentioned in the following description can be a second component within the technical spirit of the present disclosure.

A display device according to the present disclosure can be realized by a television system, a video player, a personal computer (PC), a home theater, a vehicle electric apparatus, and a smartphone, but the present disclosure is not limited thereto. The display device according to the present disclosure can be realized by a light emitting display device (LED), a quantum dot display device (QDD), a liquid crystal display device (LCD), or the like. However, a light emitting display device that directly emits light based on inorganic light emitting diodes or organic light emitting diodes (e.g., no backlight unit needed) will be described as an example for convenience of description.

The following embodiments can be partially or entirely bonded to or combined with each other and can be linked and operated in technically various ways. The embodiments can be carried out independently of or in association with each other.

Like numbers refer to like elements throughout the specification. Hereinafter, embodiments of the present disclosure will be described in detail with reference to the attached drawings. In the following description, if a detailed description of known techniques associated with the present disclosure would unnecessarily obscure the gist of the present disclosure, detailed description thereof will be omitted.

Figure 2:
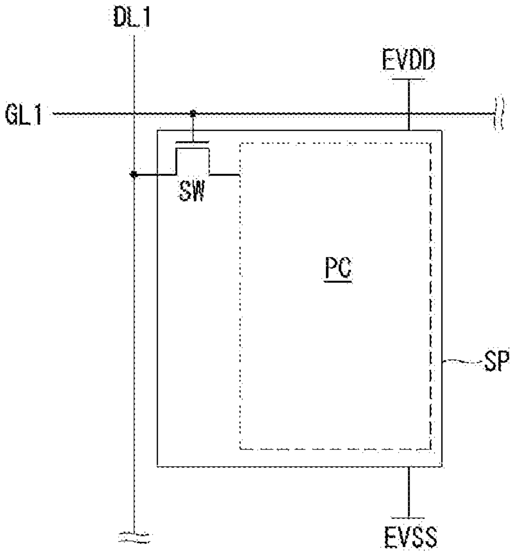
FIG. 2 is a diagram schematically showing a sub-pixel of FIG. 1 according to an embodiment of the present disclosure.
Figure 3:
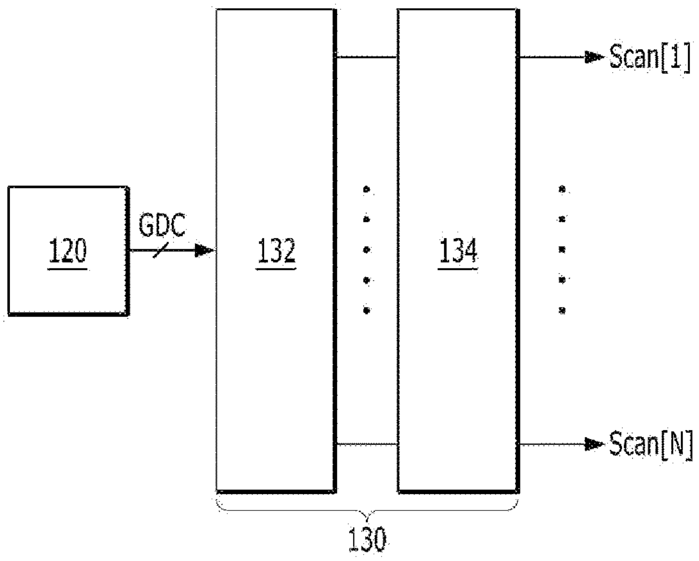
FIG. 3 is a block diagram schematically showing a configuration of a gate driving circuit according to an embodiment of the present disclosure.

FIG. 1 is a block diagram schematically showing a configuration of a display device according to an embodiment of the present disclosure, FIG. 2 is a diagram schematically showing a sub-pixel of FIG. 1 according to an embodiment of the present disclosure, and FIG. 3 is a block diagram schematically showing a configuration of a gate driving circuit of FIG. 1 according to an embodiment of the present disclosure.

As shown in FIGS. 1 to 3, the display device can include an image provider 110 (e.g., host system), a timing controller 120, a gate driving circuit 130, a data driver 140, a display panel 150, a power supply 180, and the like.

The image provider 110 can output various driving signals together with an externally supplied image data signal or an image data signal stored in an internal memory. The image provider 110 can supply data signals and various driving signals to the timing controller 120.

The timing controller 120 can output a gate timing control signal (GDC) for controlling the operation timing of the gate driving circuit 130, a data timing control signal (DDC) for controlling the operation timing of the data driver 140, and various synchronization signals (e.g., a vertical synchronization signal Vsync and a horizontal synchronization signal Hsync), and the like. The timing controller 120 can provide a data signal DATA supplied from the image provider 110 to the data driver 140 together with the data timing control signal DDC. The timing controller 120 can be implemented in the form of an integrated circuit (IC) and mounted on a printed circuit board, without being limited thereto.

The power supply 180 can transform power supplied from the outside into first power with a high potential and second power with a low potential and output the same through a first power line EVDD and a second power line EVSS under the control of the timing controller 120. The power supply 180 can generate and output not only the first power and the second power, but also gate voltages including a gate high voltage and a gate low voltage required to drive the gate driving circuit 130, a voltage required to drive the data driver 140, and the like.

The data driver 140 can sample and latch the data signal DATA in response to the data timing control signal DDC supplied from the timing controller 120, convert the digital data signal into an analog data voltage based on a gamma reference voltage, and output the analog data voltage. The data driver 140 can supply data voltages to sub-pixels included in the display panel 150 through data lines DLI to DLn. The data driver 140 can be implemented in the form of an IC and mounted on the display panel 150 or mounted on a printed circuit board, without being limited thereto.

The display panel 150 can include gate lines GL and data lines DL arranged in a matrix form, and a plurality of sub-pixels SP disposed at intersections of the gate lines GL and data lines DL. As shown in FIG. 2, one sub-pixel SP can be connected to a first data line DLI, a first gate line GL1, the first power line EVDD, and the second power line EVSS. The first data line DLI is a line for transferring a data voltage, the first gate line GL1 is a line for transferring a scan signal, the first power line EVDD is a line for transferring the first power, and the second power line EVSS is a line for transferring the second power. One sub-pixel SP can include a switching transistor SW that transfers a data voltage input through the data line DL in response to a scan signal input through the gate line GL, and a pixel circuit PC that emits light in response to the data voltage. The pixel circuit PC can include a driving transistor that generates a driving current, an organic light emitting diode (OLED) that emits light in response to the driving current, and the like. An array of sub-pixels SP disposed on the same gate line GL is referred to as one horizontal line HL. The sub-pixels SP of the same horizontal line HL are turned on by the same scan signal and receive a data voltage input to the data line DL connected to each subpixel SP.

The gate driving circuit 130 can supply at least one scan signal to the sub-pixels included in the display panel 150 through the gate lines GL1 to GLm. The gate driving circuit 130 can be implemented in the form of an IC or directly formed on the display panel 150 using a gate-in-panel (GIP) structure. The gate driving circuit 130 formed in the GIP structure can be disposed on one edge of the display panel 150 or can be separately disposed on both edges of the display panel 150.

FIG. 3 is a block diagram schematically showing a configuration of the gate driving circuit according to an embodiment of the present disclosure.

Referring to FIG. 3, the gate driving circuit 130 can output scan signals Scan[1] to Scan[N] for turning on or off thin film transistors formed in the display panel 150 in response to the gate timing control signal GDC supplied from the timing controller 120. Here, the gate driving circuit 130 according to the embodiment of the present disclosure can include a scan signal generation circuit 132 and an output control circuit 134.

The scan signal generation circuit 132 generates one or more clock signals Clk1 to Clk3 and a start pulse signal VSP based on the signals output from the timing controller 120 to generate the scan signals Scan[1] to Scan[N]. The scan signal generation circuit 132 can generate the scan signals Scan[1] to Scan[N] to be supplied to the gate lines G1 to Gm by shifting the scan pulse signal in accordance with a clock timing using a shift register.

The output control circuit 134 can control output of the scan signal generation circuit 132 such that scan signals corresponding to a partial area of the display panel among the scan signals Scan[1] to Scan[N] output from the scan signal generation circuit 132 are turned off. The output control circuit 134 can receive a switch signal for controlling on/off of the scan signals from the timing control unit 120 or the IC in the gate driving circuit 130 and control the scan signal generation circuit 132 to be turned on/off such that the scan signals corresponding to the partial area are not output. For example, the scan signal generation circuit 132 can automatically turn off different portions of the display panel in order to provide different resolutions that best match the incoming input image.

Figure 4:
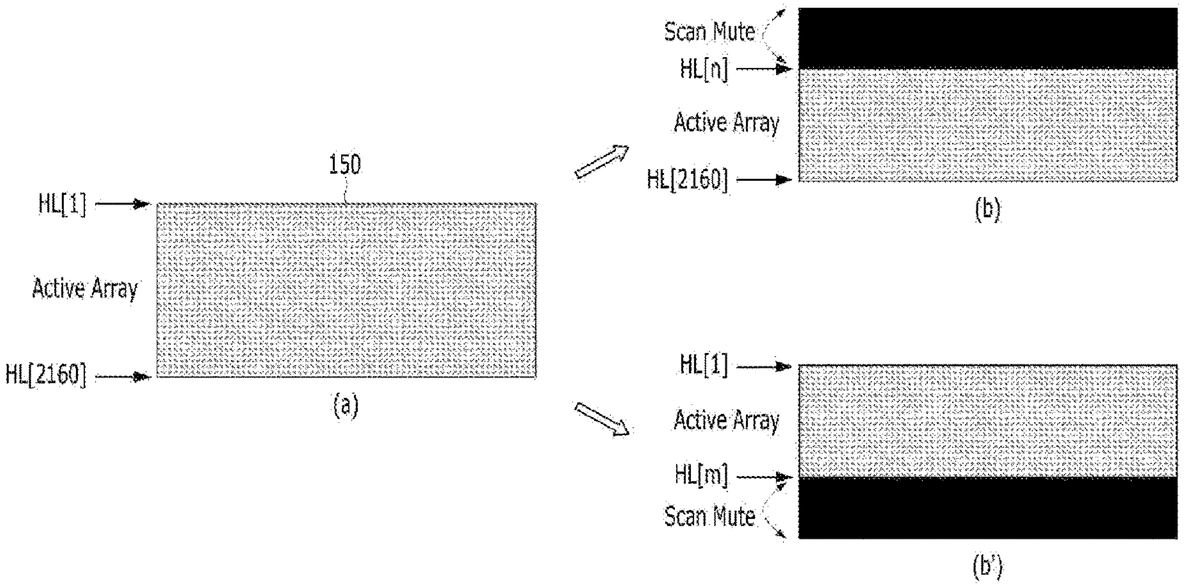
FIG. 4, including parts (a), (b) and (b'), is a diagram for describing a screen display method of a display device according to an embodiment of the present disclosure.

FIG. 4, including parts (a), (b) and (b'), is a diagram for describing a screen display method of the display device according to an embodiment of the present disclosure.

Referring to FIG. 4, when pixel arrays are arranged in horizontal lines HL[1] to HL[2160] in the display panel 150, scan signals SCAN[1] to SCAN[2160] are supplied to the horizontal lines HL[1] to HL[2160]. When all scan signals SCAN[1] to SCAN[2160] are supplied, all pixel arrays are activated and thus an image can be displayed on the entire screen of the display panel 150 as in the display panel 150 in part (a) (e.g., entire display screen is on and activated for providing a UHD image mode). The display panel 150 in which the horizontal lines are arranged from HL[1] to HL[2160] can display UHD images (275*2250), for example.

According to the embodiment of the present disclosure, scan signals output to some horizontal lines among the scan signals supplied to the display panel 150 can be turned off (Scan Mute).

Referring to part (b), if scan signals output to the upper part of the display panel 150 are turned off, the horizontal lines to which the scan signals are not input are deactivated and no image is displayed. Horizontal lines HL[n] to HL[2160] to which scan signals are input are activated and thus an image can be displayed in the lower area.

Referring to part (b'), if scan signals output to the lower part of the display panel 150 are turned off, horizontal lines to which the scan signals are not input are inactivated and no image is displayed. Horizontal lines HL[1] to HL[m] to which scan signals are input are activated and thus an image can be displayed in the upper area.

The image display area is adjusted by turning off scan signals output to the upper part or lower part of the display panel 150, as shown in part (b) and part (b'), and thus the resolution of the display panel 150 can be adjusted. For example, if 560 horizontal lines in the upper or lower part are off, the display panel can operate the same as a display panel having 1600 (2160−560) horizontal lines, and can display WQ images (275*1690) (e.g., only part of the display screen is on and activated for providing a WQ image mode).

As described above, according to the embodiment of the present disclosure, an image display area can be adjusted by cutting off output of scan signals in response to the resolution of an input image, thereby displaying a UHD mode image or a WQ mode image on the single display panel 150, realizing multiple resolutions. In addition, since scan signals are turned off in an area where no image is displayed, the operation of the gate driving circuit to output the scan signals is stopped, and thus driving efficiency can also be improved, power consumption can be reduced, and the lifespan of the device can be extended.

Figure 5:
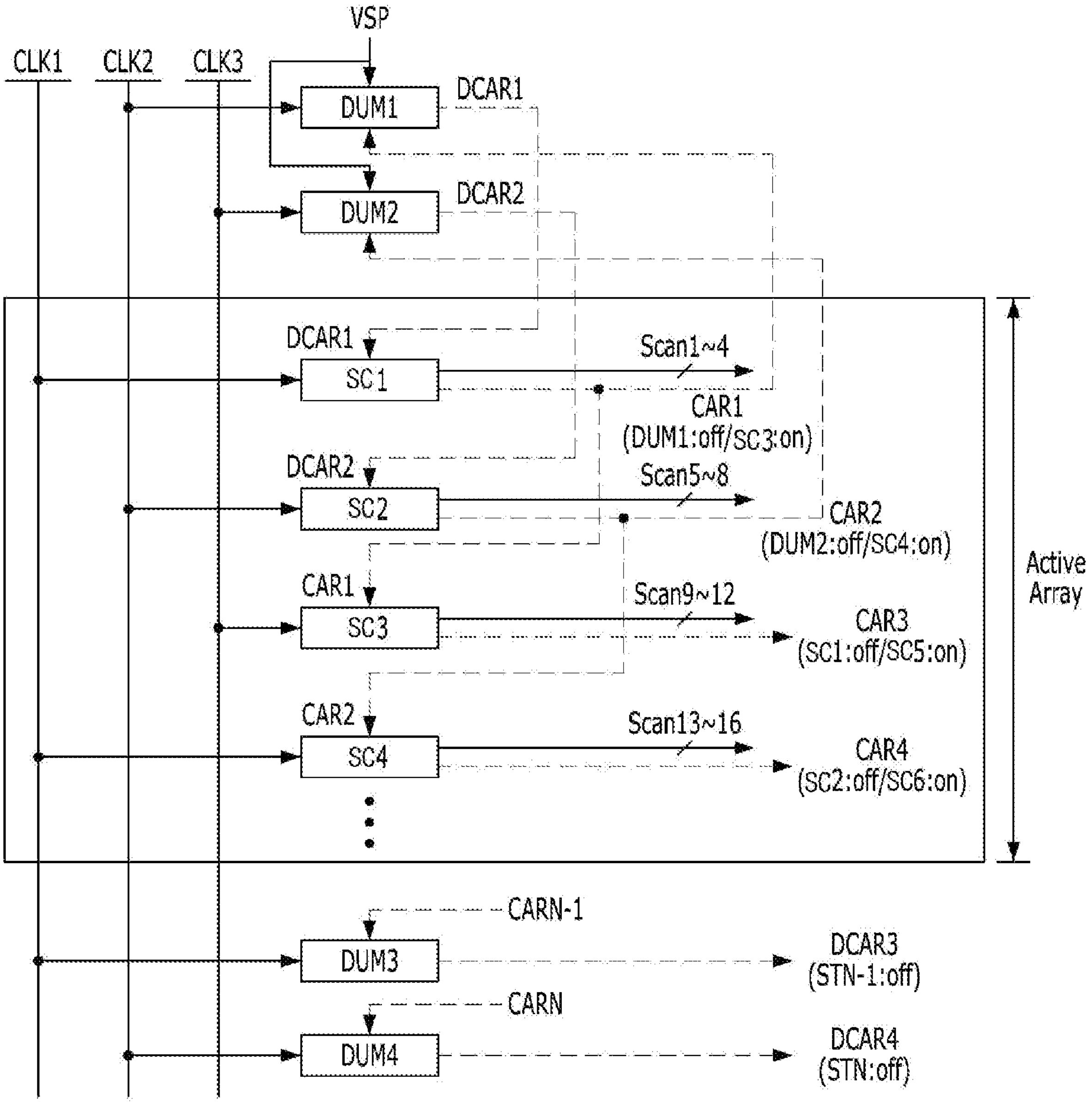
FIG. 5 is a diagram showing a schematic circuit configuration and a signal flow of a gate driving circuit according to a comparative example according to an embodiment of the present disclosure.

FIG. 5 is a diagram for describing a schematic circuit configuration and a signal flow of a gate driving circuit according to a comparative example according to an embodiment of the present disclosure, and illustrates a configuration of a gate driving circuit applied to a display device.

As shown in FIG. 5, the gate driving circuit according to the comparative example can include a plurality of scan signal output circuits SC1, SC2, SC3, SC4, . . . driven by receiving three-phase clock signals CLK1, CLK2, and CLK3 and a start pulse signal VSP, and dummy circuits DUM1, DUM2, DUM3, and DUM4. The gate driving circuit 130 is disposed in a non-display area NA of the display panel 150, and the plurality of scan signal output circuits SC1, SC2, SC3, SC4, . . . can output scan signals for driving sub-pixels SP disposed in a display area AA.

The scan signal output circuits SC1, SC2, SC3, SC4, . . . can be turned on by carry signals received from the previous scan signal output circuits and turned off by carry signals received from the following scan signal output circuits. During a turned-on period, each scan signal output circuit can output a scan signal and the carry signal. In the present embodiment, a k-th scan signal output circuit SCk is turned on by a carry signal CARN−2 received from a (k−2)-th scan signal output circuit. The turned-on k-th scan signal output circuit SCk outputs scan signals SCAN for four lines in response to the clock signals CLK1 to CLK3 and outputs a carry signal CARk to a (k+2)-th scan signal output circuit SCk+2 and the (k−2)-th scan signal output circuit SCk−2. The k-th scan signal output circuit SCk is turned off by a carry signal CARk+2 received from the (k+2)-th scan signal output circuit.

The dummy circuits DUM1, DUM2, DUM3, and DUM4 do not output a scan signal and can output only carry signals for turning on or off the scan signal output circuits. The first dummy circuit DUM1 and the second dummy circuit DUM2 located at the top can output carry signals DCAR1 and DCAR2 for turning on the first and second scan signal output circuits SC1 and SC2. The third dummy circuit DUM3 and the fourth dummy circuit DUM4 located at the bottom can output carry signals DCAR3 and DCAR4 for turning off the last two scan signal output circuits SCN−1 and SCN.

For example, the first dummy circuit DUM1 and the second dummy circuit DUM2 are turned on by receiving the start pulse signal VSP received through start pulse input terminals thereof. The turned-on first dummy circuit DUM1 outputs the carry signal DCAR1 for turning on the first scan signal output circuit SC1, and the second dummy circuit DUM2 outputs the carry signal DCAR2 for turning on the second scan signal output circuit SC2. Thereafter, the first dummy circuit DUM1 is turned off by receiving the carry signal CAR1 received from the first scan signal output circuit SC1. The second dummy circuit DUM2 is turned off by receiving the carry signal CAR2 received from the second scan signal output circuit SC2.

The first scan signal output circuit SC1 is turned on by receiving the carry signal DCAR1 from the first dummy circuit DUM1. The first scan signal output circuit SC1 can output scan signals Scan1 to Scan4 corresponding to first to fourth horizontal lines HL1 to HL4 for turning on or off transistors included in the sub-pixels SP disposed on the first to fourth horizontal lines HL1 to HL4. Further, the first scan signal output circuit SC1 outputs the carry signal CAR1 to the first dummy circuit DUM1 located in a previous stage and the third scan signal output circuit SC3 located in a following stage. The first scan signal output circuit SC1 is turned off by receiving the carry signal CAR3 from the third scan signal output circuit SC3.

The second scan signal output circuit SC2 is turned on by receiving the carry signal DCAR2 from the second dummy circuit DUM2. The second scan signal output circuit SC2 outputs scan signals Scan5 to Scan8 corresponding to fifth to eighth horizontal lines HL5 to HL8 for turning on or off transistors included in the sub-pixels SP disposed on the fifth to eighth horizontal lines HL5 to HL8. Further, the second scan signal output circuit SC2 outputs the carry signal CAR2 to the second dummy circuit DUM2 located in a previous stage and the fourth scan signal output circuit SC4 located in a following stage. The second scan signal output circuit SC2 is turned off by receiving the carry signal CAR4 from the fourth scan signal output circuit SC4.

The third scan signal output circuit (SC2) is turned on by receiving the carry signal CAR1 from the first scan signal output circuit SC1 located in a previous stage, and is turned off by receiving a carry signal CAR5 from the fifth scan signal output circuit SC5 located in a following stage. The third scan signal output circuit SC3 outputs scan signals Scan9 to Scan12 corresponding to ninth to twelfth horizontal lines HL9 to HL12 for turning on or off transistors included in the sub-pixels SP disposed on the ninth to twelfth horizontal lines HL9 to HL12. The carry signal CAR3 of the third scan signal output circuit SC2 turns off the first scan signal output circuit SC1 and turns on the fifth scan signal output circuit SC5.

The third dummy circuit DUM3 and the fourth dummy circuit DUM4 are turned on by receiving carry signals CARN−1 and CARN received from the last two scan signal output circuits SCN−1 and SCN. The turned-on third dummy circuit DUM3 outputs the carry signal DCAR3 for turning off the scan signal output circuit SCN−1 located in a previous stage. The fourth dummy circuit DUM4 outputs the carry signal DCAR4 for turning off the last scan signal output circuit SCN.

In the gate driving circuit of the comparative example including the above-described configuration, the first scan signal output circuit SC1 to the last N-th scan signal output circuit SCN can be sequentially driven to supply scan signals to all horizontal lines. Accordingly, all pixel arrays included in the display panel 150 are activated to display an image on the entire screen.

The gate driving circuit according to the embodiment of the present disclosure can automatically control or adjust the resolution of an active array area by turning off scan signals output to a partial area of the display panel. To this end, the gate driving circuit can further include the output control circuit 134 that transfers on-carry signals applied to scan signal output circuits from which scan signal output will be cut off, among the scan signal output circuits SC1, SC2, SC3, SC4, . . . that output scan signals, to scan signal output circuits from which scan signals will be output, and transfers off-carry signals input from turned-on scan signal output circuits to the scan signal output circuits that output the on-carry signals.

Figure 6:
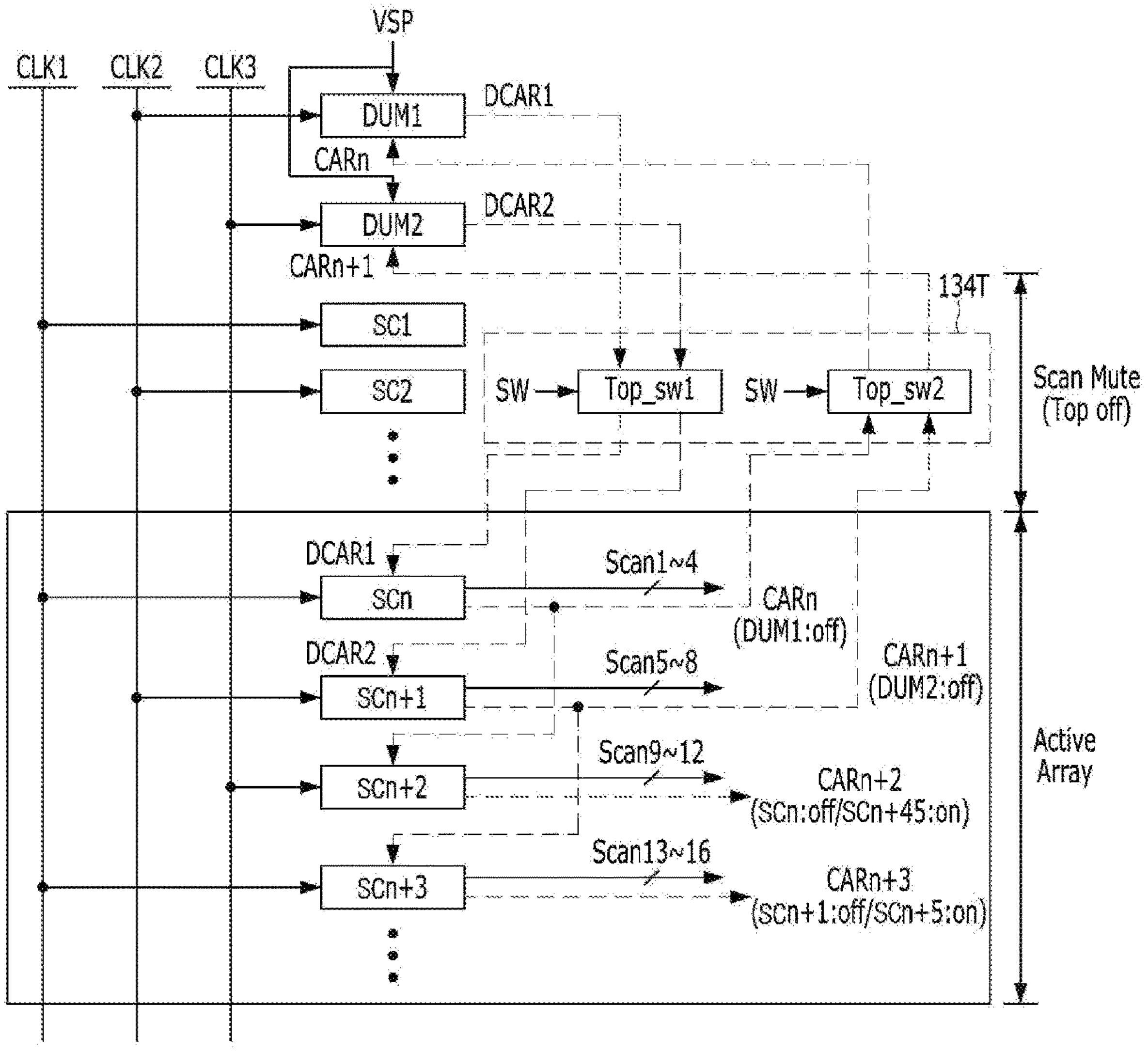
FIG. 6 is a diagram showing a schematic circuit configuration and a signal flow of a gate driving circuit according to an embodiment of the present disclosure.
Figure 7:
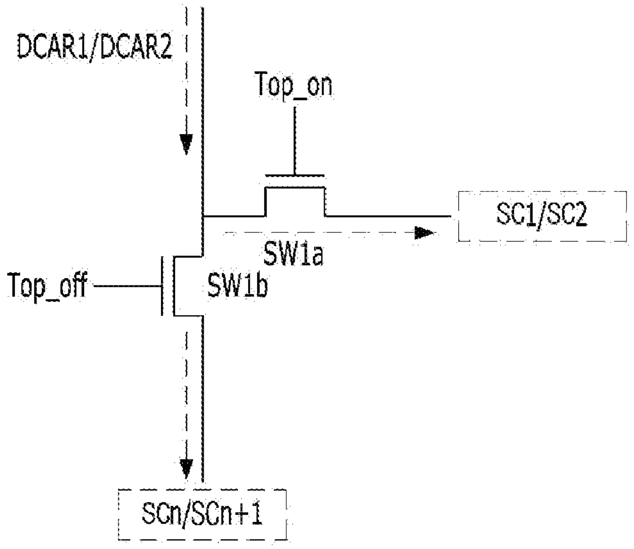
FIGS. 7 and 8 are diagrams showing configuration examples of a scan output control circuit of FIG. 6 according to embodiments of the present disclosure.
Figure 8:
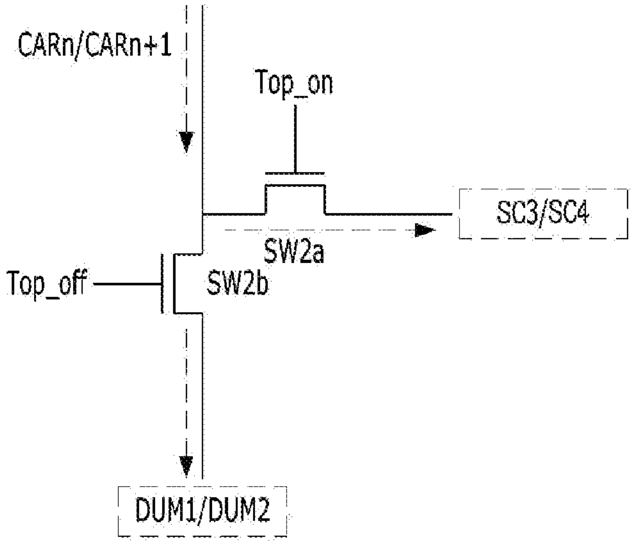

FIGS. 6 to 8 are diagrams for describing a schematic circuit configuration and signal flows of a gate driving circuit according to a first embodiment of the present disclosure and illustrate a method of turning off top scan signals output from first scan output circuit SC1 to an (n−1)-th scan signal output circuit SCn−1 and displaying an image in the lower area of the display panel. FIG. 6 is a diagram showing a schematic circuit configuration and a signal flow of the gate driving circuit according to the first embodiment of the present disclosure, and FIGS. 7 and 8 show a configuration example of an output control circuit 134T of FIG. 6.

Referring to FIG. 6, the gate driving circuit according to the first embodiment of the present disclosure can include a plurality of scan signal output circuits SC1, SC2, SC3, SC4, . . . that are driven by receiving three-phase clock signals CLK1, CLK2, and CLK3 and a start pulse signal VSP, dummy circuits DUM1 and DUM2, and a top output control circuit 134T which sets paths of an on-carry signal and an off-carry signal according to a switch signal SW for selecting on/off of top scan signals. For example, the gate driving circuit shown in FIG. 6 can selectively deactivate a top portion of the display panel in order to adjust the resolution.

As in the comparative example described above, in the plurality of scan signal output circuits SC1, SC2, SC3, SC4, . . . and the dummy circuits DUM1 and DUM2, a k-th scan signal output circuit SCk is turned on by a carry signal CARk−2 received from a (k−2)-th scan signal output circuit and turned off by a carry signal CARk+2 received from a (k+2)-th scan signal output circuit. The turned-on k-th scan signal output circuit SCk outputs a carry signal CARk to the (k+2)-th scan signal output circuit SCk+2 and the (k−2)-th scan signal output circuit SCk−2 such that the scan signal output circuit in the previous stage is turned off and the scan signal output circuit in the next stage is turned on. Each of the plurality of scan signal output circuits SC1, SC2, SC3, SC4, . . . outputs four scan signals when turned on, and the dummy circuits DUM1 and DUM2 do not output scan signals and output only carry signals DCAR1 and DCAR2. In the following description, a carry signal applied to the previous stage to turn off the scan signal output circuit in the previous stage will be referred to as an off-carry signal, and a carry signal applied to the next stage to turn on the scan signal output circuit in the next stage will be referred to as an on-carry signal.

The top output control circuit 134T receives on-carry signals for turning on top scan signal output circuits from the first scan signal output circuit SC1 to the (n−1)-th scan signal output circuit SCn−1 and off-carry signals for turning off scan signal output circuits that output the on-carry signals. The top output control circuit 134T transfers on-carry signals DCAR1 and DCAR2 to the first scan signal output circuit SC1 and the second scan signal output circuit SC2 or to the n-th scan signal output circuit SCn and the (n+1)-th scan signal output circuit SCn+1 according to a switch signal SW for selecting on/off of top scan signals from the first scan signal output circuit SC1 to the (n−1)-th scan signal output circuit SCn−1. In addition, the top output control circuit 134T can transfer an off-carry signal output from the n-th scan signal output circuit SCn to the (n−2)-th scan signal output circuit SCn−2 or to the scan signal output circuit that has provided the on-carry signal to the n-th scan signal output circuit SCn.

The top output control circuit 134T can include a first top switch Top_sw1 for setting a path of an on-carry signal and a second top switch Top_sw2 for setting a path of an off-carry signal according to a switch signal SW for selecting turn-off of top scan signals. Here, the switch signal SW can be provided by the timing controller 120 depending on the resolution of an input image or provided according to a user selection, without being limited thereto.

The first top switch Top_sw1 transfers the on-carry signal DCAR1 of the first dummy circuit DUM1 to the n-th scan signal output circuit SCn and transfers the on-carry signal DCAR2 of the second dummy circuit DUM2 to the (n+1)-th scan signal output circuit SCn+1 when the switch signal SW for selecting turn-off of the top scan signals from the first scan signal output circuit SC1 to the (n−1)-th scan signal output circuit SCn−1 is input thereto. Accordingly, the first scan signal output circuit SC1 and the second scan signal output circuit SC2 are maintained in an off state, and thus the first scan signal output circuit SC1 to the (n−1)-th scan signal output circuit Sen−1, which are sequentially turned on, are maintained in an off state. Accordingly, the top scan signals from the first scan signal output circuit SC1 to the (n−1)-th scan signal output circuit SCn−1 are turned off.

The n-th scan signal output circuit SCn is turned on by receiving the on-carry signal DCAR1 of the first dummy circuit DUM1 through the first top switch Top_sw1. The n-th scan signal output circuit SCn can output first to fourth scan signals Scan1 to Scan4 to 4n-th to (4n+3)-th horizontal lines HL4*n* to HL4*n*+3. In addition, the n-th scan signal output circuit SCn outputs an on-carry signal CARn to the (n+2)-th scan signal output circuit SCn+2 located in a following stage and outputs the off-carry signal CARn to the second top switch Top_sw2.

The (n+1)-th scan signal output circuit SCn+1 is turned on by receiving the on-carry signal DCAR2 of the second dummy circuit DUM2 through the first top switch Top_sw1. The (n+1)-th scan signal output circuit SCn+1 can output fifth to eighth scan signals Scan5 to Scan8 to (4n+4)-th to (4n+7)-th horizontal lines HL4*n*+4 to HL4*n*+7. In addition, the (n+1)-th scan signal output circuit SCn+1 outputs an on carry signal CARn+1 to the (n+3)-th scan signal output circuit SCn+3 located in a following stage and outputs an off-carry signal CARn+1 to the second top switch Top_sw2.

Thereafter, the (n+2)-th scan signal output circuit SCn+2 to the last scan signal output circuit are sequentially turned on to output scan signals.

The second top switch Top_sw2 transfers the off-carry signal CARn of the n-th scan signal output circuit SCn to the first dummy circuit DUM1 and transfers the off-carry signal CARn+1 of the (n+1)-th scan signal output circuit SCn+1 to the second dummy circuit DUM2 when the switch signal SW for selecting turn-off of the top scan signals from the first scan signal output circuit SC1 to the (n−1)-th scan signal output circuit (SCn−1) is input. Accordingly, the first dummy circuit DUM1 and the second dummy circuit DUM2 can be turned off.

The first top switch Top_sw1 for setting a path of an on-carry signal and the second top switch Top_sw2 for setting a path of an off-carry signal according to the switch signal SW for selecting on/off of the top scan signals can be implemented along with a gate-in-panel (GIP) circuit.

FIGS. 7 and 8 are diagrams showing an example of a configuration of the top output control circuit 134T of FIG. 6. FIG. 7 is a diagram showing a configuration of the first top switch Top_sw1, and FIG. 8 is a diagram showing a configuration of the second top switch Top_sw2.

Referring to FIG. 7, the first top switch Top_sw1 can include a first switch SW1*a* and a second switch SW1*b* connected to a transfer line of the on-carry signal DCAR1 of the first dummy circuit DUM1 and the on-carry signal DCAR2 of the second dummy circuit DUM2.

The first switch SW1*a* of the first top switch Top_sw1 is turned on when a top scan signal turn-on signal Top_on is input thereto. When the first switch SW1*a* is turned on, the on-carry signal DCAR1 of the first dummy circuit DUM1 and the on-carry signal DCAR2 of the second dummy circuit DUM2 are transferred to the first scan signal output circuit SC1 and the second scan signal output circuit SC2, and thus scan signals are output to the upper area of the display panel.

The second switch SW1*b* of the first top switch Top_sw1 is turned on when an off signal Top_off for turning off the top scan signals from the first scan signal output circuit SC1 to the (n−1)-th scan signal output circuit SCn−1 is input thereto. When the second switch SW1*b* is turned on, the on-carry signal DCAR1 of the first dummy circuit DUM1 and the on-carry signal DCAR2 of the second dummy circuit DUM2 are transferred to the n-th scan signal output circuit SCn and the (n+1)-th scan signal output circuit SCn+1. Accordingly, the first scan signal output circuit SC1 to the (n−1)-th scan signal output circuit SCn−1 are maintained in an off state, and thus the scan signals are not output to the upper area of the display panel (e.g., a portion of the display panel can be turned off or deactivated).

Referring to FIG. 8, the second top switch Top_sw2 can include a first switch SW2*a* and a second switch SW2*b* connected to a transfer line of the off-carry signal CARn of the n-th scan signal output circuit SCn and the off-carry signal CARn of the (n+1)-th scan signal output circuit SCn+1.

The first switch SW2*a* of the second top switch Top_sw2 is turned on when the scan signal turn-on signal Top_on is input thereto. When the first switch SW2*a* is turned on, the off-carry signal CARn of the n-th scan signal output circuit SCn is transferred to the (n−2)-th scan signal output circuit SCn−2, and the off-carry signal CARn+1 of the (n+1)-th scan signal output circuit SCn+1 is transferred to the (n−1)-th scan signal output circuit SCn−1.

The second switch SW2*b* of the second top switch Top_sw2 is turned on when the off signal Top_off for turning on the top scan signals from the first scan signal output circuit SC1 to the (n−1)-th scan signal output circuit SCn−1 is input thereto. When the second switch SW2*b* is turned on, the off-carry signal CARn of the n-th scan signal output circuit SCn is transferred to the first dummy circuit DUM1, and the off-carry signal CARn+1 of the (n+1)-th scan signal output circuit SCn+1 is transferred to the second dummy circuit DUM2. Accordingly, the dummy circuits DUM1 and DUM2 that have provided the on-carry signals to the n-th scan signal output circuit SCn and the (n+1)-th scan signal output circuit SCn+1 can be turned off.

According to the first embodiment of the present disclosure having the above-described configuration, the top output control circuit 134T transfers the on-carry signal DCAR1 of the first dummy circuit DUM1 to the n-th scan signal output circuit SCn and transfers the on-carry signal DCAR2 of the second dummy circuit DUM2 to the (n+1)-th scan signal output circuit SCn+1 according to the switch signal SW for selecting on/off of the top scan signals from the first scan signal output circuit SC1 to the (n−1)-th scan signal output circuit SCn−1. Accordingly, the first scan signal output circuit SC1 to the (n−1)-th scan signal output circuit SCn−1 are maintained in an off state, and thus the scan signals can be turned off. Since the n-th scan signal output circuit SCn and the (n+1)-th scan signal output circuit SCn+1 are immediately turned on by the on-carry signals DCAR1 and DCAR2 of the dummy circuits DUM1 and DUM2 to output scan signals, no additional driving time is required to turn off the top scan signals.

Accordingly, at the time of switching from an image mode (e.g., UHD mode) using the entire area of the display panel to an image mode (e.g., WQ mode) using a partial area by turning off the upper area, it is possible to immediately switch between the modes to display an image without driving time for turning off scan signals (e.g., a viewer may not notice any delay when switching between the UHD mode and the WQ mode, which provides a more responsive display and improves user convenience). As a result, mode switching is possible without loss of a driving frequency. In addition, since scan signal output circuits that do not output scan signals are maintained in an off state and signal processing is stopped, system resources and driving power can be conserved resulting in energy savings and less heat is generated.

Figure 9:
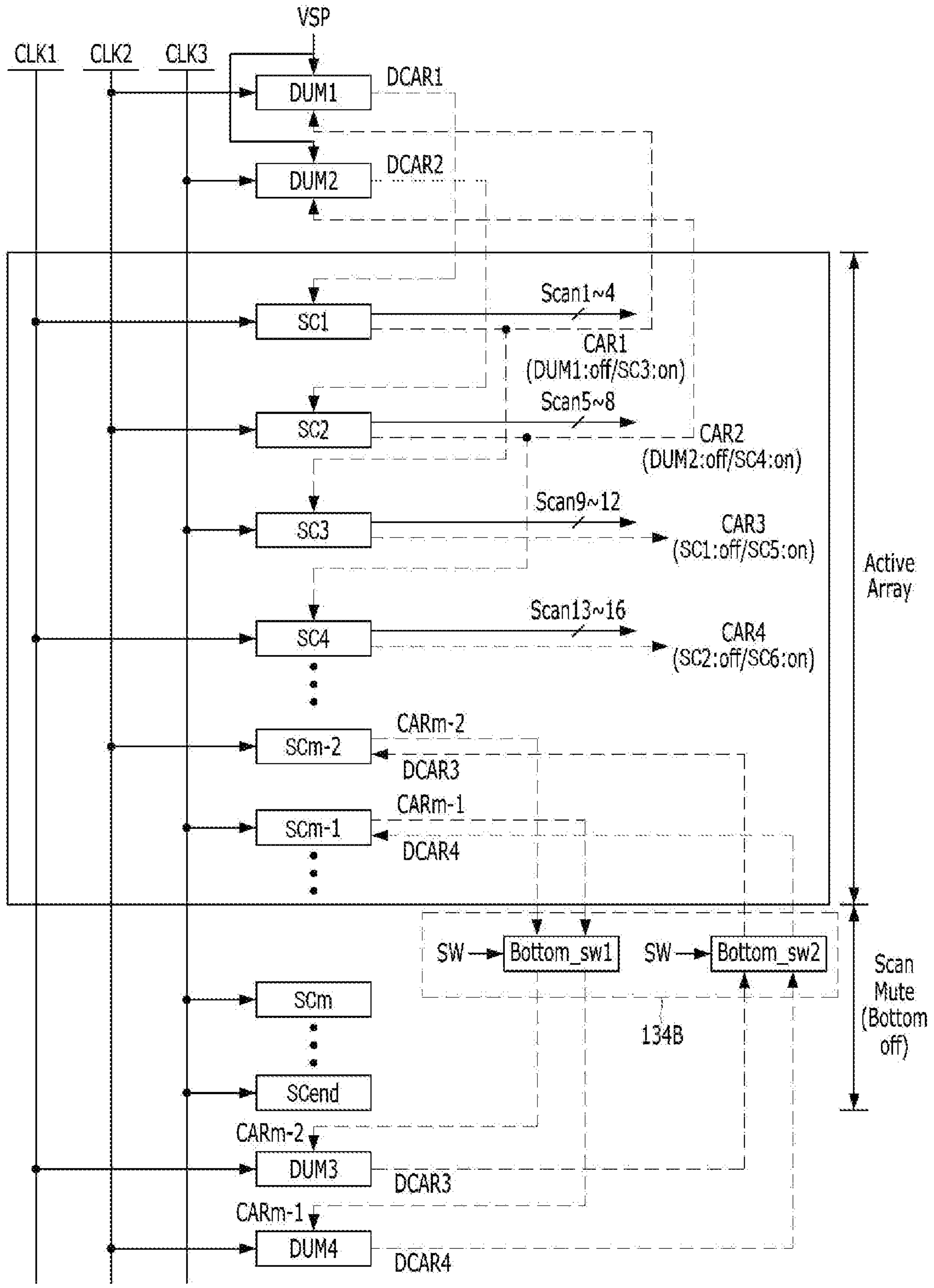
FIG. 9 is a diagram showing a schematic circuit configuration and a signal flow of a gate driving circuit according to another embodiment of the present disclosure.
Figure 10:
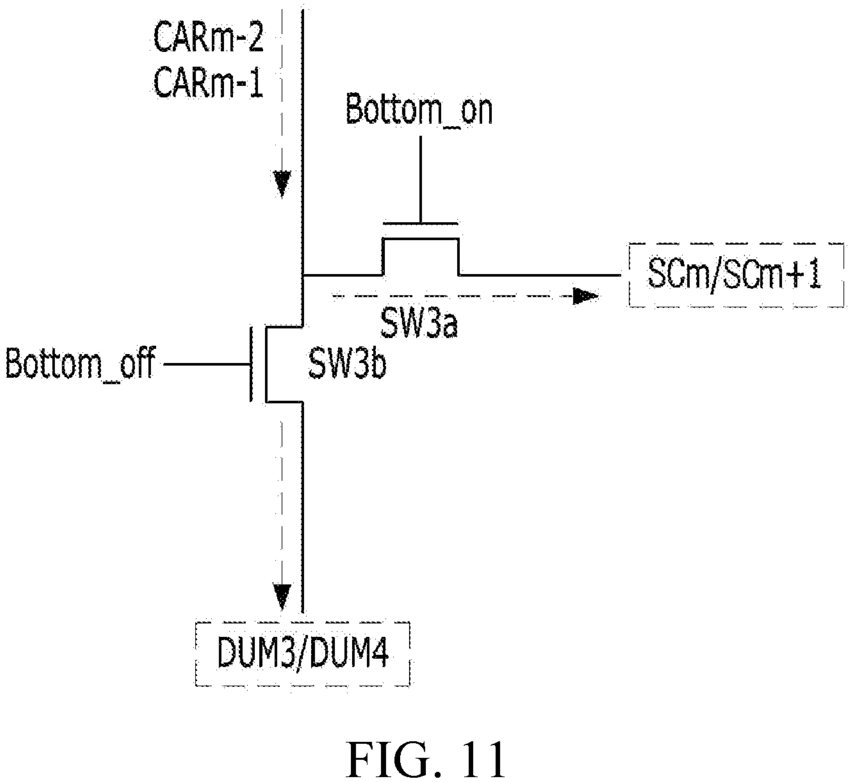
FIGS. 10 and 11 are diagrams showing configuration examples of a scan output control circuit of FIG. 9 according to embodiments of the present disclosure.
Figure 11:
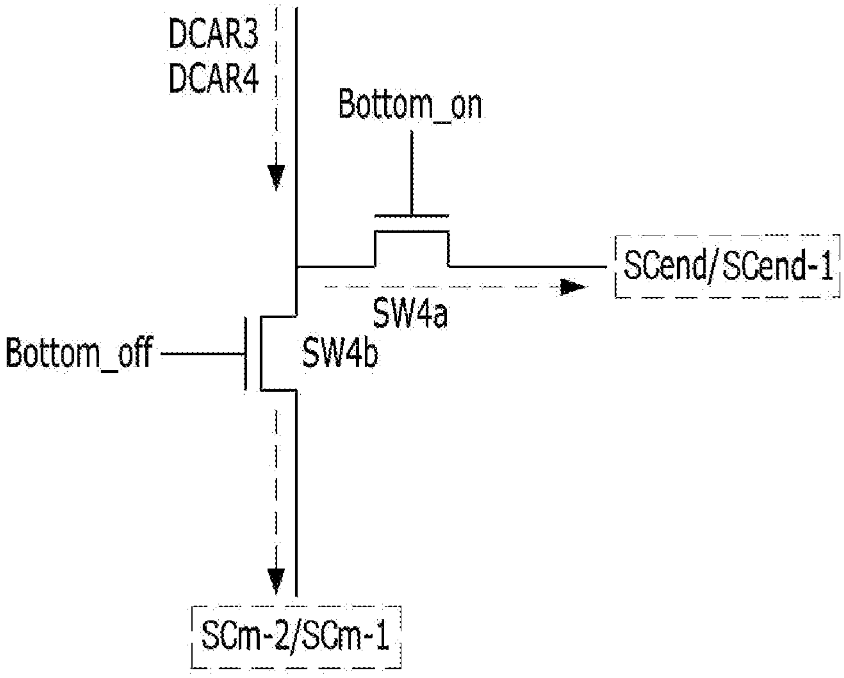

FIGS. 9 to 11 are diagrams for describing a schematic circuit configuration and a signal flow of a gate driving circuit according to a second embodiment of the present disclosure and illustrate a method of turning off bottom scan signals output from an m-th scan signal output circuit SCm to the last scan signal output circuit SCend and displaying an image in the upper area of the display panel. FIG. 9 is a diagram showing a schematic circuit configuration and a signal flow of the gate driving circuit according to the second embodiment of the present disclosure, and FIGS. 10 and 11 show an example of a configuration of a bottom output control circuit 134B of FIG. 9.

Referring to FIG. 9, the gate driving circuit according to the second embodiment of the present disclosure can include a plurality of scan signal output circuits SC1 to SCend driven by receiving 3-phase clock signals CLK1, CLK2, and CLK3 and a start pulse signal VSP, dummy circuits DUM1, DUM2, DUM3, and DUM4, and the bottom output control circuit 134B which sets paths of an on-carry signal and an off-carry signal according to a switch signal SW for selecting on/off of bottom scan signals from the m-th scan signal output circuit SCm to the last scan signal output circuit SCend. For example, the gate driving circuit shown in FIG. 9 can selectively deactivate a bottom portion of the display panel in order to adjust the resolution.

As in the comparative example described above, in the plurality of scan signal output circuits SC1 to SCend and the dummy circuits DUM1, DUM2, DUM3, and DUM4, the k-th scan signal output circuit SCk is turned on by the on-carry signal CARN−2 received from the (k−1)-th scan signal output circuit and turned off by the off-carry signal CARk+2 received from the (k+2)-th scan signal output circuit. The turned-on k-th scan signal output circuit SCk outputs four scan signals, outputs the on-carry signal CARk to the (k+2)-th scan signal output circuit SCk+2, and outputs the off-carry signal CARk to the (k−2)-th scan signal output circuit SCk−2. Each of the plurality of scan signal output circuits SC1 to SCend outputs four scan signals when turned on, and the dummy circuits DUM1, DUM2, DUM3, and DUM4 do not output scan signals and output only on-carry signals and off-carry signals DCAR1, DCAR2, DCAR3, and DCAR4.

The bottom output control circuit 134B receives on-carry signals CARm−2 and CARm−1 for turning on the m-th scan signal output circuit SCm and the (m+1)-th scan signal output circuit SCm+1 and off-carry signals DUM3 and DUM4 for turning off the last scan signal output circuit SCend and the previous scan signal output circuit SCend−1 at the bottom from the m-th scan signal output circuit SCm to the last scan signal output circuit SCend. The bottom output control circuit 134B transfers the on-carry signals CARm−2 and CARm−1 to the bottom dummy circuits DUM3 and DUM4 or to the m-th scan signal output circuit SCm and the (m+1)-th scan signal output circuit SCm+1 according to a switch signal SW for selecting on/off of bottom scan signals from the m-th scan signal output circuit SCm to the last scan signal output circuit SCend. In addition, the bottom output control circuit 134B can transfer the off-carry signals DCAR3 and DCAR4 output from the bottom dummy circuits DUM3 and DUM4 to the last and previous scan signal output circuits SCend and SCend−1 or to the scan signal output circuits SCm−2 and SCm−1 that provide the on-carry signals CARm−2 and CARm−1.

The bottom output control circuit 134B can include a first bottom switch Bottom_sw1 for setting a path of an on-carry signal and a second bottom switch Bottom_sw2 for setting a path of an off-carry signal according to a switch signal SW for selecting turn-off of the bottom scan signals from the m-th scan signal output circuit SCm to the last scan signal output circuit SCend. Here, the switch signal SW can be provided by the timing controller 120 depending on the resolution of an image or provided according to user selection, without being limited thereto.

The first bottom switch Bottom_sw1 transfers the on-carry signal CARm−2 for turning on the m-th scan signal output circuit SCm to the third dummy circuit DUM3 and transfers the on-carry signal CARm−1 for turning on the (m+1)-th scan signal output circuit SCm+1 to the fourth dummy circuit DUM4 when the switch signal SW for selecting turn-off of the bottom scan signals from the m-th scan signal output circuit SCm to the last scan signal output circuit SCend is input thereto. Accordingly, the m-th scan signal output circuit SCm to the last scan signal output circuit SCend are maintained in an off state, and thus the scan signals corresponding to the lower area of the display panel can be turned off.

The third dummy circuit DUM3 is turned on by receiving the on-carry signal CARm−2 through the first bottom switch Bottom_sw1. The fourth dummy circuit DUM4 is turned on by receiving the on-carry signal CARm−1 through the first bottom switch Bottom_sw1. The third dummy circuit DUM3 and the fourth dummy circuit DUM4 do not output scan signals and output off-carry signals DCAR3 and DCAR4.

The second bottom switch Bottom_sw2 can transfer the off-carry signals DCAR3 and DCAR4 output from the third and fourth dummy circuits DUM3 and DUM4 to the scan signal output circuits SCm−2 and SCm−1 that provide the on-carry signals CARm−2 and CARm−1 when the switch signal SW for selecting turn-off of the bottom scan signals from the m-th scan signal output circuit SCm to the last scan signal output circuit SCend is input thereto. Accordingly, the scan signal output circuits SCm−2 and SCm−1 that provide the on-carry signals CARm−2 and CARm−1 can be turned off.

According to the switch signal SW for selecting on/off of the bottom scan signals, the first bottom switch Bottom_sw1 for setting a path of an on-carry signal and the second bottom switch Bottom_sw2 for setting a path of an off-carry signal can be implemented along with a GIP circuit.

FIGS. 10 and 11 are diagrams showing an example of a configuration of the bottom output control circuit 134B of FIG. 9. FIG. 10 is a diagram showing a configuration of the first bottom switch Bottom_sw1 and FIG. 11 is a diagram showing a configuration of the second bottom switch Bottom_sw2.

Referring to FIG. 10, the first bottom switch Bottom_sw1 can include a first switch SW3*a* and a second switch SW3*b* connected to a transfer line of the on-carry signal CARm−2 of the (m−2)-th scan signal output circuit SCm−2 and the on-carry signal CARm−1 of the (m−1)-th scan signal output circuit SCm−1.

The first switch SW3*a* of the first bottom switch Bottom_sw1 is turned on when a bottom scan signal turn-on signal Bottom_on is input thereto. When the first switch SW3*a* is turned on, the on-carry signal CARm−2 of the (m−2)-th scan signal output circuit SCm−2 and the on-carry signal CARm−1 of the (m−1)-th scan signal output circuit SCm−1 is transferred to the m-th scan signal output circuit SCm and the (m+1)-th scan signal output circuit SCm+1. Accordingly, the m-th scan signal output circuit SCm to the last scan signal output circuit SCend are sequentially turned on and thus the scan signals are output to the lower area of the display panel.

The second switch SW3*b* of the first bottom switch Bottom_sw1 is turned on when an off signal Bottom_off for turning off the bottom scan signals from the m-th scan signal output circuit SCm to the last scan signal output circuit SCend is input thereto. When the second switch SW3*b* is turned on, the on-carry signal CARm−2 of the (m−2)-th scan signal output circuit SCm−2 and the on-carry signal CARm−1 of the (m−1)-th scan signal output circuit SCm−1 is transferred to the third dummy circuit DUM3 and the fourth dummy circuit DUM4. Accordingly, the m-th scan signal output circuit SCm to the last scan signal output circuit SCend are maintained in an off state, and thus the scan signals are not output.

Referring to FIG. 11, the second bottom switch Bottom_sw2 can include a first switch SW4*a* and a second switch SW4*b* connected to a transfer line of the off-carry signals DCAR3 and DCAR4 output from the third and fourth dummy circuits DUM3 and DUM4.

The first switch SW4*a* of the second bottom switch Bottom_sw2 is turned on when the bottom scan signal turn-on signal Bottom_on is input thereto. When the first switch SW4*a* is turned on, the off-carry signal DCAR3 of the third dummy circuit DUM3 is transferred to the (end-1)-th scan signal output circuit SCend−1 and the off-carry signal DCAR4 of the fourth dummy circuit DUM4 is transferred to the last scan signal output circuit SCend.

The second switch SW4*b* of the second top switch Top_sw2 is turned on when the off signal Bottom_off for turning off the bottom scan signals from the m-th scan signal output circuit SCm to the last scan signal output circuit SCend is input thereto. When the second switch SW4*b* is turned on, the off-carry signal DCAR3 of the third dummy circuit DUM3 is transferred to the (m−2)-th scan signal output circuit SCm−2 and the off-carry signal DCAR4 of the fourth dummy circuit DUM4 is transferred to the (m−1)-th scan signal output circuit SCm−1. Accordingly, the (m−2)-th scan signal output circuit SCm−2 and the (m−1)-th scan signal output circuit SCm−1 which have provided the on-carry signals to the third dummy circuit DUM3 and the fourth dummy circuit DUM4 can be turned off.

According to the second embodiment of the present disclosure having the above-described configuration, the bottom output control circuit 134B transfers the on-carry signal CARm−2 of the (m−2)-th scan signal output circuit SCm−2 and the on-carry signal CARm−1 of the (m−1)-th scan signal output circuit SCm−1 to the third dummy circuit DUM3 and the fourth dummy circuit DUM4 according to the switch signal SW for selecting on/off of the bottom scan signals from the m-th scan signal output circuit SCm to the last scan signal output circuit SCend. Accordingly, the m-th scan signal output circuit SCm to the last scan signal output circuit SCend are maintained in an off state, and thus the scan signals can be turned off. In this way, since the m-th scan signal output circuit SCm to the last scan signal output circuit SCend can be maintained in an off state, no additional driving time is required to turn off the bottom scan signals. Accordingly, at the time of switching from an image mode (e.g., UHD mode) using the entire area of the display panel to an image mode (e.g., WQ mode) using a partial area by turning off the upper area, the screen can be displayed by immediately switching between the modes without driving time for turning off the scan signals (e.g., a viewer may not experience any delay when switching between the UHD mode and the WQ mode, which provides a more responsive display and improves user convenience). As a result, mode switching is possible without loss of a driving frequency. In addition, since scan signal output circuits that do not output scan signals are maintained in an off state and signal processing is stopped, system resources and driving power can be conserved resulting in energy savings and less heat is generated.

Figure 12:
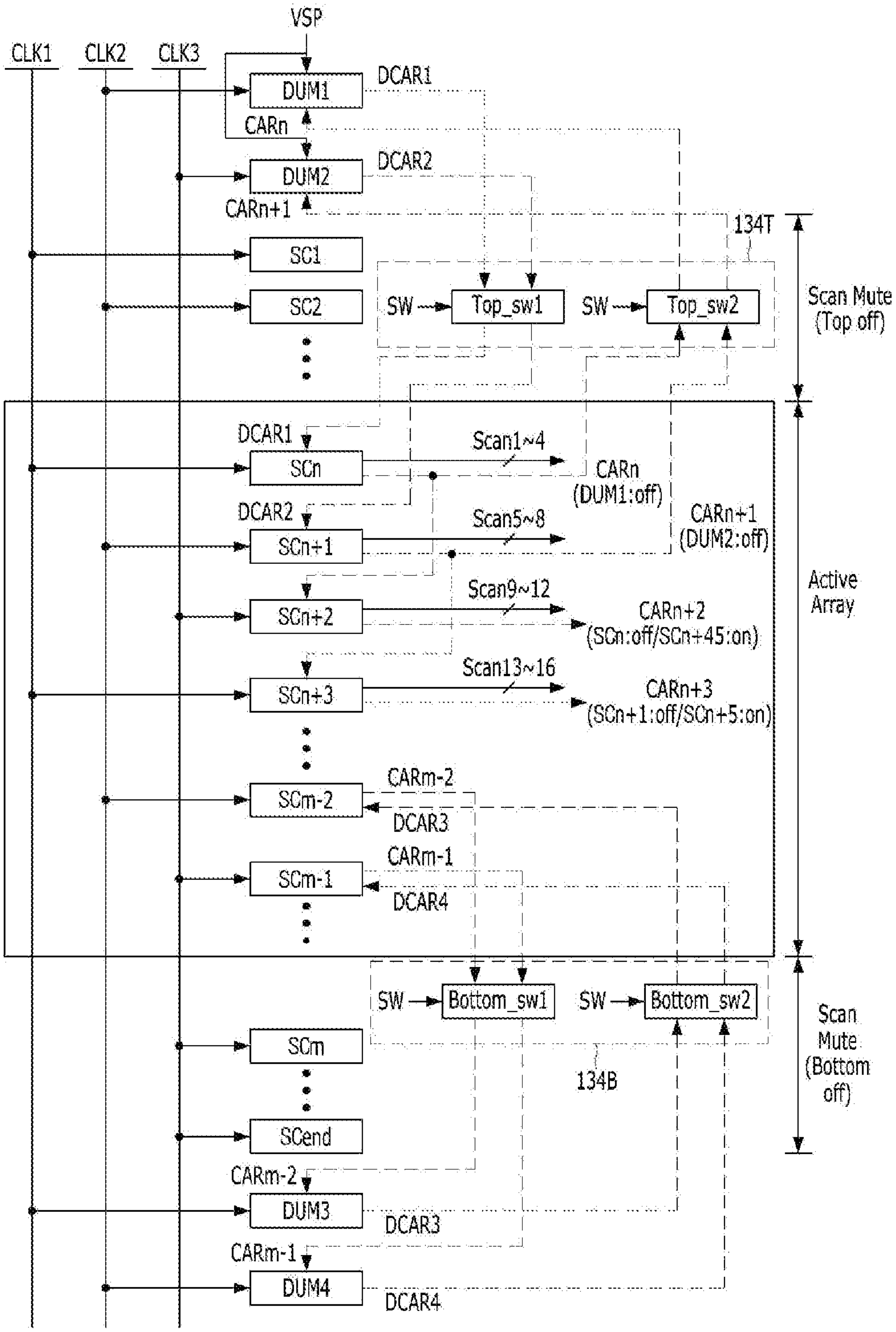
FIG. 12 is a diagram showing a schematic circuit configuration and a signal flow of a gate driving circuit according to another embodiment of the present disclosure.

FIG. 12 is a diagram showing a schematic circuit configuration and a signal flow of a gate driving circuit according to a third embodiment of the present disclosure. The third embodiment of the present disclosure illustrates the configuration of a gate driving circuit including both the top output control circuit 134T and the bottom output control circuit 134B. For example, the gate driving circuit shown in FIG. 12 can selectively deactivate either one of a top portion of the display panel or a bottom portion of the display panel, in order to adjust the resolution.

The top output control circuit 134T can set paths of an on-carry signal and an off-carry signal to turn on/off top scan signals according to a switch signal SW for selecting on/off of top scan signals from the first scan signal output circuit SC1 to the (n−1)-th scan signal output circuit SCn−1.

The bottom output control circuit 134B can set paths of an on-carry signal and an off-carry signal to turn on/off bottom scan signals according to a switch signal SW for selecting on/off of bottom scan signals from the m-th scan signal output circuit SCm to the last scan signal output circuit SCend.

Only one of the top output control circuit 134T and the bottom output control circuit 134B can selectively operate to turn off the top or bottom scan signals, or both the top output control circuit 134T and the bottom output control circuit 134B can operate to turn off the top scan signals from the first scan signal output circuit SC1 to the (n−1)-th scan signal output circuit SCn−1 and the bottom scan signals from the m-th scan signal output circuit SCm to the last scan signal output circuit SCend.

The switch signals SW for controlling the top output control circuit 134T and the bottom output control circuit 134B are provided by the timing control unit 120 depending on the size of an input image or can be directly set by the user, without being limited thereto.

Since a method of driving the top output control circuit 134T and the bottom output control circuit 134B of the third embodiment is the same as the driving methods of the first and second embodiments, detailed description thereof is omitted.

As described above, according to the embodiments of the present disclosure, it is possible to turn off the top scan signals from the first scan signal output circuit SC1 to the (n−1)-th scan signal output circuit SCn−1 or turn off the bottom scan signals from the m-th scan signal output circuit SCm to the last scan signal output circuit SCend by applying a simple circuit for changing a path of a carry signal for turning on/off scan signal output circuits outputting scan signals. In addition, since scan signals are turned off by maintaining scan signal output circuits that output the scan signals in an off state, an additional driving time to turn off the scan signals is not required. Therefore, at the time of switching from an image mode (e.g., UHD mode) using the entire area of the display panel to an image mode (e.g., WQ mode) using a partial area by turning off the upper area, the screen can be displayed by immediately switching between the modes without driving time for turning off the scan signals (e.g., a viewer may not experience any delay when switching between the UHD mode and the WQ mode, which provides a more responsive display and improves user convenience). As a result, mode switching is possible without loss of a driving frequency. In addition, since scan signal output circuits that do not output scan signals are maintained in an off state and signal processing is stopped, system resources and driving power can be conserved resulting in energy savings and less heat is generated.

The present embodiments have the following effects.

The gate driving circuit and the display device using the same according to the present embodiments have the effect of realizing multiple resolutions in a single display panel by changing the resolution of the display panel in response to an input image with a simple circuit configuration. For example, the display panel can provide different resolutions by using the entire display panel, or selectively deactivating a top portion of the display panel or a bottom portion of the display panel.

The gate driving circuit and the display device using the same according to the present embodiments can improve driving efficiency by blocking the output of the gate driving circuit in an unused area at the time of displaying an image having a resolution lower than that of the display panel, which reduces power consumption and extends the lifespan of the device.

It will be apparent to those skilled in the art that various modifications and variations can be made in the present disclosure without departing from the spirit or scope of the disclosure.

What is claimed is:

1. A display device comprising:

a display panel including at least one gate line corresponding to pixel areas arranged in a horizontal direction; and a gate driving circuit configured to supply a scan signal to the at least one gate line, wherein the gate driving circuit includes:

a plurality of scan signal output circuits configured to be sequentially turned on by a first carry signal input from previous stages to output the scan signal to a corresponding gate line and turned off by a second carry signal input from following stages; and an output control circuit configured to:

transfer the first carry signal input to a scan signal output circuit to be turned off to a scan signal output circuit to be turned on, and transfer the second carry signal input from a stage following the scan signal output circuit to be turned off to a scan signal output circuit that outputs the first carry signal.

2. The display device of claim 1, wherein the gate driving circuit includes:

a top dummy circuit configured to be turned on in response to a start pulse signal to apply the first carry signal to a first scan signal output circuit among the plurality of scan signal output circuits; or a bottom dummy circuit configured to be turned on in response to the first carry signal input from a last scan signal output circuit among the plurality of scan signal output circuits to apply the second carry signal to the last scan signal output circuit.

3. The display device of claim 2, wherein the output control circuit includes:

a top output control circuit configured to:

selectively prevent the first carry signal input from the top dummy circuit from being received by the first scan signal output circuit and transfer the first carry signal to an N-th scan signal output circuit, and transfer the second carry signal output from the N-th scan signal output circuit to the top dummy circuit according to a selection signal for turning off top scan signal output circuits including the first scan signal output circuit to an (N−1)-th scan signal output circuit.

4. The display device of claim 3, wherein the top output control circuit includes:

a first switch configured to be turned on in response to receiving the selection signal for turning off the top scan signal output circuits including the first scan signal output circuit to the (N−1)-th scan signal output circuit, in order to set a path for the first carry signal; and a second switch configured to be turned on in response to receiving the selection signal for turning off the top scan signal output circuits including the first scan signal output circuit to the (N−1)-th scan signal output circuit, in order to set a path of the second carry signal.

5. The display device of claim 2, wherein the output control circuit includes:

a bottom output control circuit configured to:

selectively prevent the first carry signal input from the bottom dummy circuit from being received by an m-th scan signal output circuit, and transfer the second carry signal output from the bottom dummy circuit to a scan signal output circuit that outputs the first carry signal according to a selection signal for turning off bottom scan signal output circuits including the m-th scan signal output circuit to the last scan signal output circuit.

6. The display device of claim 5, wherein the bottom output control circuit includes:

a first switch configured to be turned on in response to receiving the selection signal for turning off the bottom scan signal output circuits including the m-th scan signal output circuit to the last scan signal output circuit, in order to set a path for the first carry signal; and a second switch configured to be turned on in response to receiving the selection signal for turning off the bottom scan signal output circuits including the m-th scan signal output circuit to the last scan signal output circuit, in order to set a path of the second carry signal.

7. The display device of claim 2, wherein the output control circuit is further configured to:

transfer the first carry signal applied from a k-th scan signal output circuit among the plurality of scan signal output circuits to a (k+2)-th scan signal output circuit, and transfer the second carry signal to a (k−2)-th scan signal output circuit.

8. The display device of claim 7, wherein the output control circuit includes:

a first switch configured to:

transfer the first carry signal applied from a first top dummy circuit to the N-th scan signal output circuit, and transfer the first carry signal applied from a second top dummy circuit to an (N+1)-th scan signal output circuit according to the selection signal for turning off the top scan signal output circuits including the first scan signal output circuit to the (N−1)-th scan signal output circuit; and a second switch configured to:

transfer the second carry signal applied from the N-th scan signal output circuit to the first top dummy circuit, and transfer the second carry signal applied from the (N+1)-th scan signal output circuit to the second top dummy circuit according to the selection signal for turning off the top scan signal output circuits including the first scan signal output circuit to the (N−1)-th scan signal output circuit.

9. The display device of claim 7, wherein the output control circuit comprises:

a first switch configured to:

transfer the first carry signal applied from an (m−2)-th scan signal output circuit to the first bottom dummy circuit, and transfer the first carry signal applied from an (m−1)-th scan signal output circuit to the second bottom dummy signal according to the selection signal for turning off the bottom scan signal output circuits including the m-th scan signal output circuit to the last scan signal output circuit; and a second switch configured to:

transfer the second carry signal applied from the first bottom dummy circuit to the (m−1)-th scan signal output circuit, and transfer the second carry signal applied from the second bottom dummy circuit to the (m−1)-th scan signal output circuit according to the selection signal for turning off the bottom scan signal output circuits including the m-th scan signal output circuit to the last scan signal output circuit.

10. The display device of claim 2, wherein each of the plurality of scan signal output circuits sequentially outputs scan signals for four lines when turned on by receiving the first carry signal.

11. A gate driving circuit comprising:

a plurality of scan signal output circuits configured to be sequentially turned on by a first carry signal input from previous stages to output at least one scan signal and turned off by a second carry signal input from following stages; and an output control circuit configured to:

transfer the first carry signal input to a scan signal output circuit to be turned off to a scan signal output circuit to be turned on, and transfer the second carry signal input from a stage following the scan signal output circuit to be turned off to a scan signal output circuit that outputs the first carry signal.

12. The gate driving circuit of claim 11, further comprising:

at least one top dummy circuit configured to be turned on in response to a start pulse signal input to apply the first carry signal to a first scan signal output circuit among the plurality of scan signal output circuits; and at least one bottom dummy circuit configured to be turned on in response to the first carry signal input from a last scan signal output circuit among the plurality of scan signal output circuits to apply the second carry signal to the last scan signal output circuit.

13. The gate driving circuit of claim 12, wherein the output control circuit includes:

a top output control circuit configured to:

selectively prevent the first carry signal input from the top dummy circuit from being received by the first scan signal output circuit and transfer the first carry signal an N-th scan signal output circuit, and transfer the second carry signal output from the N-th scan signal output circuit to the top dummy circuit according to a selection signal for turning off top scan signal output circuits including the first scan signal output circuit to an (N−1)-th scan signal output circuit.

14. The gate driving circuit of claim 12, wherein the output control circuit includes:

a bottom output control circuit configured to:

transfer the first carry signal for an m-th scan signal output circuit to the bottom dummy circuit, and transfer the second carry signal output from the bottom dummy circuit to a scan signal output circuit that outputs the first carry signal according to a selection signal for turning off bottom scan signal output circuits including the m-th scan signal output circuit to the last scan signal output circuit.

15. A display device comprising:

a display panel including a plurality of pixels; and a plurality of scan signal output circuits configured to output scan signals to a plurality of scan lines; and an output control circuit configured to:

change routing paths of an on-carry signal and an off-carry signal based on a switch signal, in order to selectively deactivate a portion of the display panel or active an entirety of the display panel.

16. The display device of claim 15, wherein the output control circuit includes:

a first switching circuit configured to:

in response to receiving the switch signal for turning off a portion of the display panel, supply the off-carry signal to a first dummy circuit and supply the on-carry signal to an N-th scan signal output circuit among the plurality of scan signal output circuits, and in response to receiving the switch signal for turning on the entirety of the display panel, supply the off-carry signal to a following scan signal output circuit located subsequent to a first scan signal output circuit among the plurality of scan signal output circuits and supply the on-carry signal to a second scan signal output circuit among the plurality of scan signal output circuits.

17. The display device of claim 16, wherein the portion of the display panel includes a bottom portion of the display panel or a top portion of the display panel.

18. The display device of claim 15, wherein the output control circuit includes:

a top output control circuit configured to selectively deactivate a top portion of the display panel for changing a resolution of the display panel, and a bottom output control circuit configured to selectively deactivate a bottom portion of the display panel for changing the resolution of the display panel.

19. The display device of claim 15, wherein the output control circuit is configured to deactivate first through N−1 scan signal output circuits among the plurality of scan signal output circuits and activate N-th through M scan signal output circuits among the plurality of scan signal output circuits based on the switch signal, where M and N are positive integers and M is greater than N.

20. The display device of claim 15, wherein the output control circuit is configured to activate first through N−1 scan signal output circuits among the plurality of scan signal output circuits and deactivate N-th through M scan signal output circuits among the plurality of scan signal output circuits based on the switch signal, where M and N are positive integers and M is greater than N.

* * * * *